United States Patent
Hu

(10) Patent No.: US 11,755,471 B2
(45) Date of Patent: Sep. 12, 2023

(54) ON-DIE STATIC RANDOM-ACCESS MEMORY (SRAM) FOR CACHING LOGICAL TO PHYSICAL (L2P) TABLES

(71) Applicant: Yangtze Memory Technologies Co., Ltd., Hubei (CN)

(72) Inventor: Ken Hu, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 31 days.

(21) Appl. No.: 17/450,732

(22) Filed: Oct. 13, 2021

(65) Prior Publication Data

US 2022/0253379 A1 Aug. 11, 2022

Related U.S. Application Data

(63) Continuation of application No. PCT/CN2021/075939, filed on Feb. 8, 2021.

(51) Int. Cl.
*G06F 12/00* (2006.01)
*G06F 12/02* (2006.01)
(Continued)

(52) U.S. Cl.
CPC ........ *G06F 12/0246* (2013.01); *G06F 3/0604* (2013.01); *G06F 3/0659* (2013.01);
(Continued)

(58) Field of Classification Search
CPC .. G06F 12/0246; G06F 3/0604; G06F 3/0659; G06F 3/0673; G06F 12/0653;
(Continued)

(56) References Cited

U.S. PATENT DOCUMENTS 8,688,894 B2 4/2014 Kuehne
10,769,066 B2 9/2020 Moon et al.
(Continued)

FOREIGN PATENT DOCUMENTS

CN 101344867 A 1/2009
CN 106775466 A 5/2017
(Continued)

OTHER PUBLICATIONS

International Search Report of the International Searching Authority directed to related International Patent Application No. PCT/CN2021/075939, dated Nov. 5, 2021; 4 pages.

*Primary Examiner* — Mardochee Chery
(74) *Attorney, Agent, or Firm* — Sterne, Kessler, Goldstein & Fox P.L.L.C.

(57) ABSTRACT

The present disclosure describes methods and systems for reading data from a flash memory. A method can include receiving, by a flash memory controller, a read request for data stored in a plurality of flash memory dies. The read request contains a logical address of the data. Each flash memory die of the plurality of flash memory dies includes one or more flash memory arrays and one or more on-die static random access memory (SRAM) storage devices. The method also includes identifying an on-die SRAM storage of a flash memory die containing logical-to-physical (L2P) information and searching the L2P information to obtain a physical address of the data that corresponds to the logical address. The method further includes retrieving the data from a flash memory array of the flash memory die using the physical address.

20 Claims, 3 Drawing Sheets

(51) Int. Cl.
*G06F 3/06* (2006.01)
*G06F 12/06* (2006.01)

(52) U.S. Cl.
CPC ........ *G06F 3/0673* (2013.01); *G06F 12/0653* (2013.01); *G06F 2212/7201* (2013.01)

(58) Field of Classification Search
CPC ..... G06F 2212/7201; G06F 2212/1024; G06F 2212/7208; G06F 3/064; G06F 3/0688; G06F 3/061; G06F 3/0679; G11C 11/419
USPC ........................................................ 711/154
See application file for complete search history.

(56) References Cited

U.S. PATENT DOCUMENTS

| | | | |
|---|---|---|---|
| 10,811,071 B1* | 10/2020 | Li | ............................ H01L 25/18 |
| 11,221,793 B2 | 1/2022 | Li et al. | |
| 11,269,545 B2 | 3/2022 | Yuen | |
| 11,301,369 B2 | 4/2022 | Gholamipour et al. | |
| 11,308,171 B2 | 4/2022 | Chiu et al. | |
| 2005/0144509 A1 | 6/2005 | Zayas | |
| 2007/0276996 A1* | 11/2007 | Caulkins | ............. G06F 12/0804 |
| | | | 711/E12.04 |
| 2015/0186077 A1 | 7/2015 | Lee | |
| 2016/0092369 A1 | 3/2016 | Subramoney et al. | |
| 2019/0251039 A1 | 8/2019 | Modi et al. | |
| 2019/0278500 A1* | 9/2019 | Lakshmi | ............... G06F 3/0688 |
| 2020/0242021 A1 | 7/2020 | Gholamipour et al. | |

FOREIGN PATENT DOCUMENTS

| | | |
|---|---|---|
| CN | 108519858 A | 9/2018 |
| CN | 110874330 A | 3/2020 |
| CN | 111475427 A | 7/2020 |
| CN | 111656330 A | 9/2020 |
| TW | 1551989 B | 10/2016 |
| TW | 1685743 B | 2/2020 |
| TW | 202044549 A | 12/2020 |

* cited by examiner

ON-DIE STATIC RANDOM-ACCESS MEMORY (SRAM) FOR CACHING LOGICAL TO PHYSICAL (L2P) TABLES

CROSS-REFERENCE TO RELATED APPLICATIONS

This application claims priority to PCT Patent Application No. PCT/CN2021/075939, filed on Feb. 8, 2021, which is incorporated herein by reference in its entirety.

TECHNICAL FIELD

The present disclosure generally relates to the field of flash memory, and more particularly, to systems and methods for reducing latency in the operation of flash memory devices.

BACKGROUND

Memory cells are scaled to smaller sizes by improving process technology, circuit design, programming algorithm, and fabrication process. In many servers and mobile devices, NAND flash memory (a type of non-volatile storage technology) is widely used as the primary non-volatile storage device due to its high storage density and relatively low access latency. Three-dimensional (3D) NAND flash memory is developed to further increase storage density and reduce manufacturing costs. However, as smaller device size provides the benefit of significantly improved storage capacity, it is becoming increasingly challenging to efficiently and timely read and write data in memory devices.

SUMMARY

The present disclosure includes a method for reading data from a flash memory includes receiving, by a flash memory controller, a read request for data stored in a plurality of flash memory dies. The read request contains a logical address of the data. Each flash memory die of the plurality of flash memory dies includes one or more flash memory arrays and one or more on-die static random access memory (SRAM) storage devices. The method also includes identifying an on-die SRAM storage of a flash memory die containing logical-to-physical (L2P) information and searching the L2P information to obtain a physical address of the data that corresponds to the logical address. The method further includes retrieving the data from a flash memory array of the flash memory die using the physical address.

The present disclosure also includes a method for reading data from a flash memory includes receiving, by a flash memory controller, a read request for data stored in a plurality of flash memory dies. The read request includes a logical address of the data and the flash memory controller includes a controller storage. Each flash memory die of the plurality of flash memory dies includes one or more flash memory arrays and one or more on-die static random access memory (SRAM) storage. The method also includes searching the controller storage for logical-to-physical (L2P) information. In response to the L2P information being in the controller storage: the method includes obtaining a physical address of the data using the L2P information and retrieving the data from the plurality of flash memory dies using the physical address. In response to the L2P information not being in the controller storage, the method includes identifying an on-die SRAM storage device of a flash memory die containing the L2P information and searching the L2P information to obtain a physical address that corresponds to the logical address. The method further includes retrieving the data from a flash memory array of the flash memory die using the physical address.

The present disclosure further includes a flash memory system having a plurality of flash memory dies. Each flash memory die includes one or more NAND memory arrays and one or more on-die SRAM storage devices. The flash memory system also includes a flash memory controller including a controller storage and one or more processors. Upon executing instructions, the one or more processors are configured to receive a read request for data stored in the plurality of flash memory dies, wherein the read request comprises a logical address of the data. The one or more processors are further configured to identify an on-die SRAM storage containing logical-to-physical (L2P) information, the on-die SRAM storage device formed on a flash memory die of the plurality of flash memory dies. The one or more processors further configured to search the L2P information to obtain a physical address of the data that corresponds to the logical address. The flash memory controller is also configured to retrieve the data from a NAND memory array of the flash memory die using the physical address.

BRIEF DESCRIPTION OF THE DRAWINGS

Aspects of the present disclosure are best understood from the following detailed description when read with the accompanying figures. It is noted that, in accordance with the common practice in the industry, various features are not drawn to scale. In fact, the dimensions of the various features may be arbitrarily increased or reduced for clarity of illustration and discussion.

DETAILED DESCRIPTION

Figure 1:
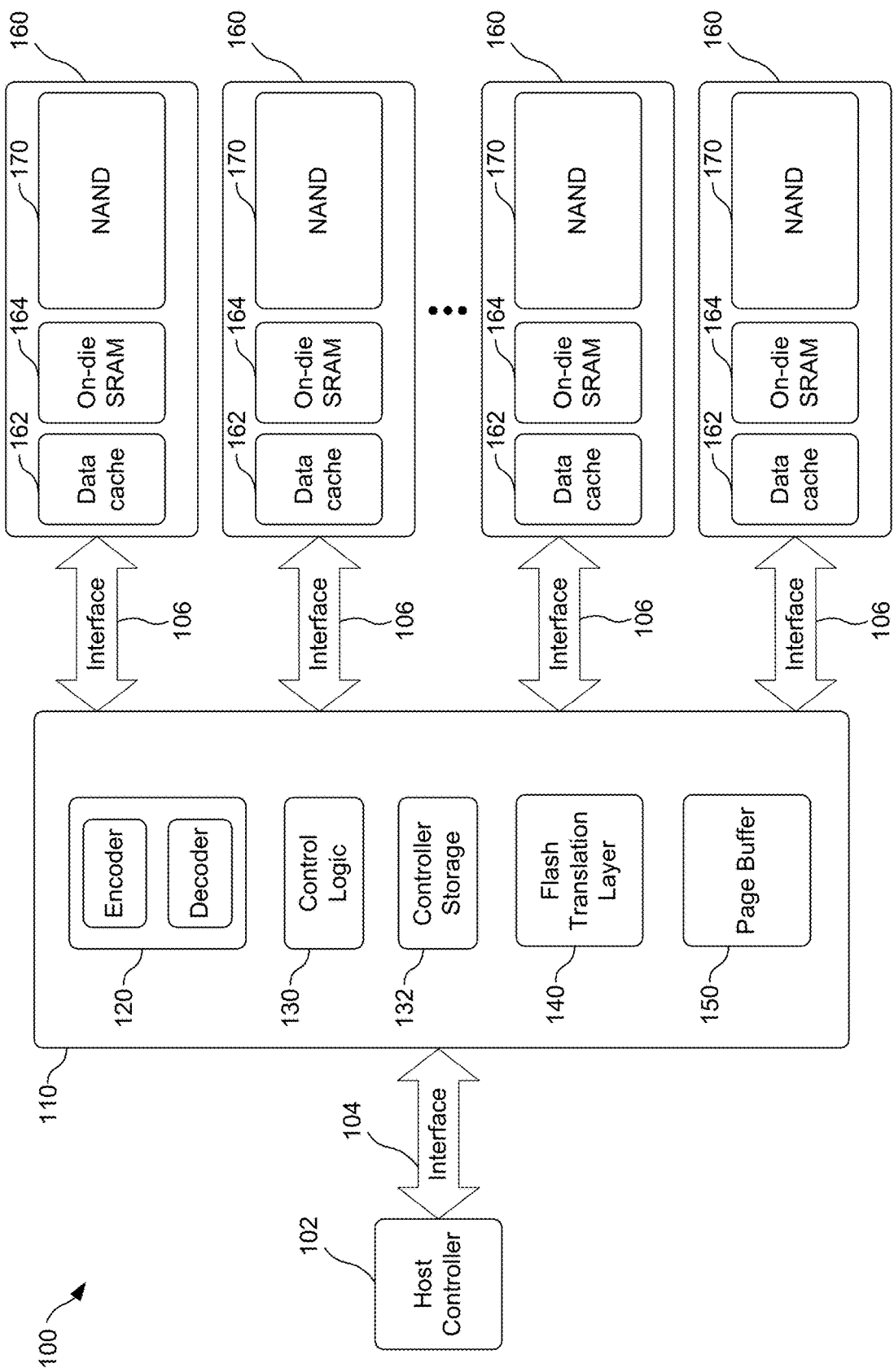
FIG. 1 is a block diagram illustrating a flash memory system, in accordance with some embodiments of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the term "substrate" refers to a material onto which subsequent material layers are added. The substrate comprises a top surface and a bottom surface. The top surface of the substrate is where a semiconductor device is formed, and therefore the semiconductor device is formed at a top side of the substrate. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer can extend over the entirety of an underlying or overlying structure, or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductor and contact layers (in which contacts, interconnect lines, and/or vias are formed) and one or more dielectric layers.

As used herein, the term "nominal/nominally" refers to a desired, or target, value of a characteristic or parameter for a component or a process operation, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

As used herein, the term "3D NAND memory device" (referred to herein as "memory device") refers to a semiconductor device with vertically-oriented strings of 3D NAND memory cell transistors (referred to herein as "memory strings," such as NAND strings or 3D NAND strings) on a laterally-oriented substrate so that the memory strings extend in the vertical direction with respect to the substrate. As used herein, the term "vertical/vertically" means nominally perpendicular to the lateral surface of a substrate.

A solid-state drive ("SSD") is a storage device capable of recording data. For example, SSD devices can use non-volatile memory components to store and retrieve data. User or device interfaces allow other systems to access the storage capacities of SSD devices. To store data persistently, various types of non-volatile memories such as flash-based memory may be used. 3D NAND memory devices are a type of non-volatile memory devices that are developed to increase data storage capacity. Flash memory devices can be fabricated with several different types of integrated circuit technologies such as NOR or NAND logic gates with floating-gates. Depending on the application, flash memory devices can be arranged in arrays and configured to be accessed as a block, a page, a word, and/or a byte. Each page can contain $2^N$ bytes, where N is an integer, and typical page sizes can be, for example, 2,048 bytes (2 kb), 4,096 bytes (4 kb), 8,192 bytes (8 kb) or more per page. Pages can be arranged in blocks. For example, a block can contain 64, 128, or more pages. The read and write operations for NAND memory devices are performed on a page-by-page basis while an erase operation can be performed on a block-by-block basis.

A hard disk is addressed linearly by logical address (e.g., logical block address) while NAND devices address memory storage by physical address (e.g., page number). Therefore, flash memory devices usually allocate a portion of the controller circuitry to maintain a record of mappings of each logical block address to the current page number where data is stored. This record mapping can be managed by a flash translation layer (FTL) that can provide a logical-to-physical (L2P) table for mapping the two addresses. The FTL can be implemented using an allocated portion of flash memory controller circuitry and controlling software. To retrieve a specific piece of data, a host device can provide a logical address of the target data and the flash memory controller can utilize L2P mapping tables to identify a physical page address of the target data in the non-volatile memory device and retrieve the stored data.

Several approaches can be used for storing and maintaining L2P mapping tables. One such approach is single-level direct L2P mapping. Under such mapping scheme, the mapping table includes an entry for each page and a summary page for metadata at the end of each block that contains logical block address information. The L2P mapping table can be stored in a memory device within the flash memory controller. For example, the L2P mapping table can be stored in a static random access memory (SRAM) device Single-level direct L2P mapping can contain the mapping information for the entire flash memory devices. Therefore, the single-level direct page mapping scheme requires a large amount of storage space (in the order of 1-2 MB per GB of user storage) to store the L2P mapping table, which can be challenging for high capacity flash storage memory devices.

Another approach for storing and maintaining L2P mapping tables is the multi-level mapping schemes. For example, multi-level mapping schemes can group together a number of adjacent logical blocks and can include a page global directory for each grouped blocks. The page global directories can be stored in a memory device (e.g., SRAM) within the flash memory controller for quick access. The mapping scheme also includes page middle directories and page tables that are stored and maintained in pages located at a memory cell level in the spare areas of the NAND memory devices. Page tables contain physical block numbers and physical page numbers of the data.

A flash translation layer ("FTL") can be located in the flash memory control module for translating a logical address to a physical address. Under the single-level direct L2P mapping, FTL can read and scan the L2P mapping table stored within the flash memory controller. Under the multi-level mapping scheme, the FTL would read the page global directory stored in the flash memory controller and access the spare memory cells of the NAND memory devices for the page middle directories and the page tables in order to retrieve the requested data address. The FTL can be a module stored in a static random-access memory (SRAM) or a dynamic random-access memory (DRAM) in the flash memory controller module. Accessing speed to the SRAM within the flash memory and spare memory cells of the NAND memory devices can be different. For example, the read latency of SRAM within the flash memory controller module can be in the order of a few microseconds, whereas the read latency from the cell level of the NAND memory devices can be an order of magnitude greater, for example, a few tens of microseconds.

With increasing storage capacity in memory devices, such as 3D NAND memories, the size of L2P tables has become immensely large and requires a substantial amount of storage space for access operation such as storing L2P tables and buffering data. Particularly, in mobile devices that do not contain DRAM storage, implementing single-level direct L2P tables in the flash memory controller SRAM storage can result in larger device size and higher manufacturing costs. On the other hand, implementing multi-level mapping scheme by storing components of L2P tables at flash memory controller and at the spare memory cells of the non-volatile memory devices can result in long latency and a decline in device performance.

To address the above shortcomings, embodiments described herein are directed to systems and methods for reducing latency in flash memory systems without expanding device footprint. More particularly, this disclosure is directed to caching L2P tables in SRAM storage that are located on the same die as the NAND flash memory arrays, i.e., on-die SRAM. For example, page middle directory and page tables can be stored in on-die SRAM for quick access by the flash memory controller. The methods can include program codes and/or algorithms that implement an indicate flag for providing the location of the L2P table that include address information for the target data. For example, the indicate flag can display a first status indicating that the target L2P table is stored in the on-die SRAM storage or a second status indicating that it is stored in the SRAM of the flash memory controller. As the flash memory system can include more than one flash memory dies, the indicate flag can also indicate which flash memory die contains the on-die SRAM that stores the target L2P table. In addition, the method can also include swapping L2P tables between various on-die SRAMs and the flash memory controller SRAM. Structures and components described in the present application can be implemented on hardware, firmware, software, or any combinations thereof. Methods and systems described in the present disclosure can reduce the read latency of 3D NAND flash memory devices by more than 90%.

FIG. 1 illustrates a block diagram of a flash memory system 100, in accordance to some embodiments. Flash memory system 100 can include a flash memory controller 110 and an array of flash memory dies 160. Flash memory controller 110 communicates with a host controller 102 through an interface 104. The host controller 102 is operable to request flash memory controller to perform read, program, and erase operations of the flash memory dies 160 by sending commands and/or data through the interface 104. Flash memory controller 110 can be configured to retrieve data from one or more flash memory dies 160 (e.g., an array of flash memory devices) and send the data to host controller 102 via data bus. The retrieved dated can be transmitted by host controller 102 to host computers or other system components, not illustrated. The array of flash memory devices can include one or more arrays of NAND flash memory, as introduced below as elements 170.

Host controller 102 sends data to be stored at flash memory dies 160 or retrieves data by instructing flash memory controller 110 to read data from flash memory dies 160. Host controller 102 can handle I/O requests received from a host computer (not illustrated in FIG. 1), ensure data integrity and efficient storage, and manage flash memory dies 160. Interface 106 can provide data and control communication between flash memory controller 110 and the flash memory dies 160 via data bus.

Flash memory controller 110 can include an encoder/decoder unit 120, a control logic 130, a controller storage 132, a flash translation layer (FTL) 140, and a page buffer 150. Other suitable components can be included in flash memory controller 110 and are not illustrated or described herein for simplicity. In some embodiments, FTL 140 can further include storage areas (e.g., SRAM) for storing L2P mapping information or any other suitable information.

Encoder/decoder unit 120 can provide encoding and decoding data processed by flash memory controller 110. Encoder/decoder unit 120 can also generate and store error correction codes (ECC) and metadata for memory management. Encoder/decoder unit 120 can be used for detecting and correcting errors in the stored data.

Control logic 130 can be any suitable integrated circuitry (e.g., one or more processors) configured to receive instructions from host controller 102 and perform read, program, erase operations—as well understood by persons of ordinary skill in the art (POSA)—of flash memory dies 160 by transmitting commands and/or data with flash memory dies 160 through interface 106. For example, control logic 130 receive requests for flash media access, such as read or write operations, from one or more external devices through host controller 102. Control logic 130 can be further configured to communicate with and control other components of flash memory controller 110. For example, control logic 130 can instruct FTL to scan internal memory storage for mapping information and send/receive address-mapping information from FTL. Control logic 130 can further communicate with encoder/decoder unit 120, page buffer 150, and other suitable components of flash memory controller 110.

Controller storage 132 can be used to store commands for the operation of control logic 130. In some embodiments, controller storage 132 can be a storage media for storing mapping information. For example, controller storage 132 can include single-level direct L2P mapping tables for a sector of the flash memory dies 160. In some embodiments, controller storage 132 can include page global directory information for the flash memory dies 160. The page global directory information can be stored in a random access memory device (RAM) and used as a pseudo-cache to provide fast lookup of mapping data. Page global directories are well understood by a POSA and are not described in detail herein for simplicity. In some embodiments, controller storage 132 can include software codes, commands, computer logic, firmware, any suitable information. In some embodiments, controller storage 132 can be an SRAM device.

Flash translation layer (FTL) 140 can be configured to provide L2P mapping table for converting logical addresses to physical addresses. Requests for accessing flash media received by control logic 130 can include one or more logical block address where user data should be read or written. FTL 140 can be configured to translate the logical block address of the desired data into a physical address by scanning through various L2P tables. For example, FTL 140 can generate L2P mapping information and send such information to storage media located in flash memory controller 110, such as controller storage 132. FTL 140 can also send the mapping information to storage media located on flash memory dies 160, such as on-die SRAM or memory cells. FTL 140 can also search abovementioned storage media for L2P information upon requests by flash memory controller 110.

Page buffer 150 can include one or more register circuitry for storing sections of data. For example, under a two-pass programming scheme page buffer 150 can store data such as lower page data, middle page data, and upper page data. Data transfers between host controller 102 and array of flash memory dies 160 can be temporarily stored in page buffer 150. The structure and functions of page buffer 150 is well understood by a POSA and are not described in detail herein for simplicity.

Flash memory dies 160 can be configured to store user data and include circuitry components for communicating with flash memory controller 110 and for storing L2P mapping information. In some embodiments, each flash memory die 160 can include data cache 162, on-die SRAM 164, and arrays of NAND flash memory array 170. Flash memory die 160 can be a memory chip (package), a memory die, or any portion of a memory die. In some embodiments, each flash memory die 160 can include one or more on-die SRAM 164 or one or more NAND flash memory arrays 170. The additional on-die SRAM 164 and NAND flash memory arrays 170 are not illustrated in FIG. 1 for simplicity.

Data cache 162 can be configured to temporarily store data that is transmitted between flash memory controller 110 and NAND flash memory array 170. For example, during a read operation for accessing stored user data from NAND flash memory array 170, data cache 162 can be configured to temporarily store the retrieved data prior to sending the retrieved data to flash memory controller 110.

On-die SRAM 164 can be configured to store L2P mapping information for quick access by flash memory controller 110. For example, under the multi-level mapping schemes, L2P mapping information, such as page middle directories and page tables, can be stored in the on-die SRAM 164 and accessed by FTL 140 of flash memory controller 110 through interface 106. Since reading data from SRAM storage media can be orders of magnitude faster than reading data from NAND flash memory cells, compared to storing L2P information in spare memory cells of NAND flash memory arrays, storing such information in an on-die SRAM 164 can provide the benefit of, among other things, lower data read latency. In some embodiments, on-die SRAM 164 can be any other suitable memory devices having greater speed than NAND flash memory cells. In some embodiments, media storage such as dynamic RAM (DRAM) can be implemented in flash memory die 160 to perform similar functions as on-die SRAM 164.

NAND flash memory array 170 can include one or more memory planes, each of which can include a plurality of memory blocks. Identical and concurrent operations can take place at each memory plane. The memory block, which can be megabytes (MB) in size, is the smallest size to carry out erase operations. Each memory block can include a plurality of memory cells, where each memory cell can be addressed through interconnections such as bit lines and word lines. The bit lines and word lines can be laid out perpendicularly (e.g., in rows and columns, respectively), forming an array of metal lines. For simplicity, the memory blocks are also referred to as "memory array" or "array." The memory array is the core area in a memory device, performing storage functions.

Figure 2:
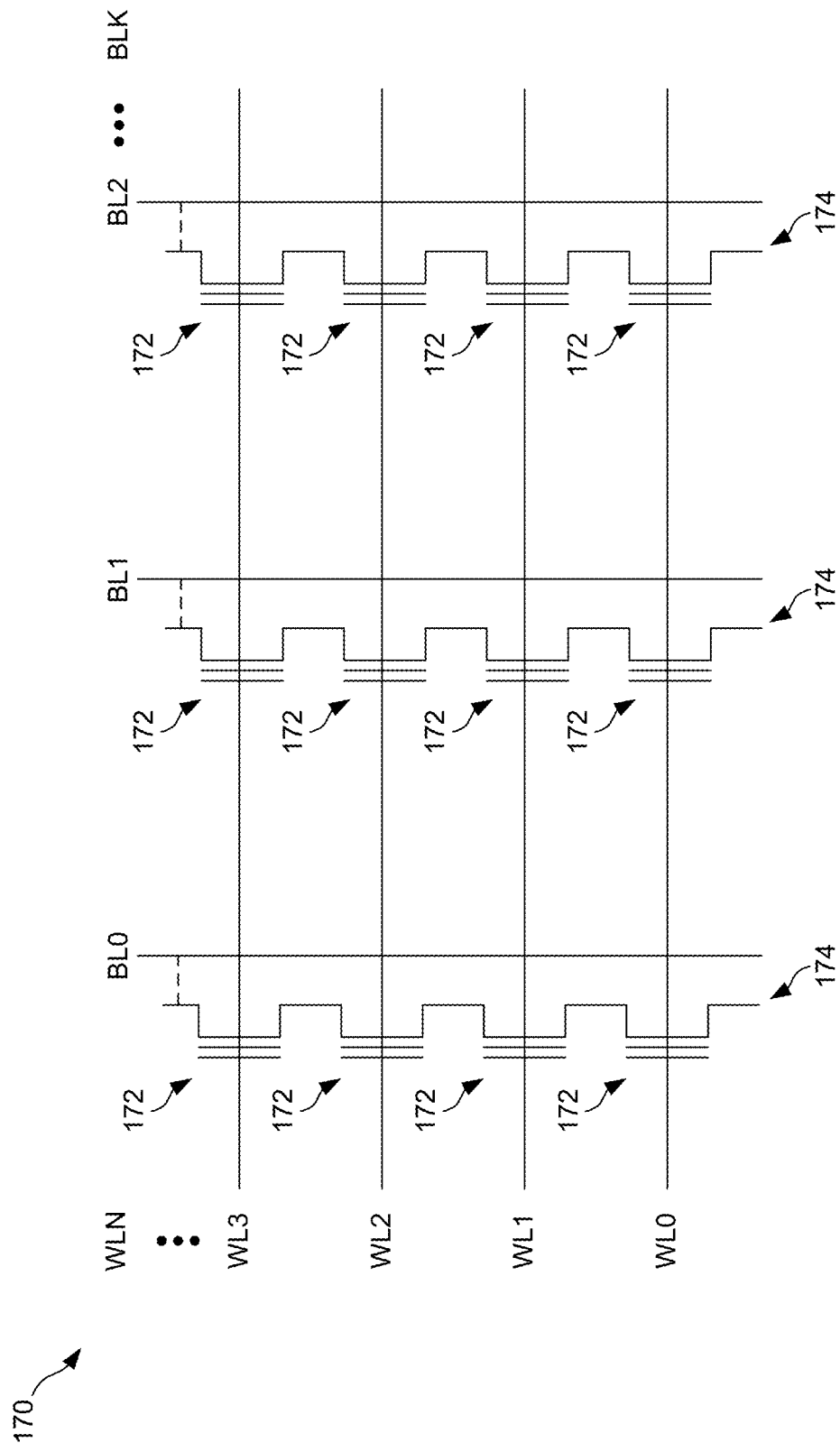
FIG. 2 is a schematic circuit diagram illustrating a flash memory array, in accordance with some embodiments of the present disclosure.

FIG. 2 is a schematic circuit diagram illustrating flash memory cell arrangements, according to some embodiments of the present disclosure. NAND flash memory arrays 170 can include an array of flash memory cells 172 that are deployed in array arrangement as shown by FIG. 2. NAND flash memory arrays 170 can be 3D NAND flash memory arrays that include a stack of gate electrodes arranged over a substrate, with semiconductor channels through and intersecting word lines, into the substrate. The bottom/lower gate electrodes function as bottom/lower selective gates. The top/upper gate electrodes function as top/upper selective gates. The word lines/gate electrodes between the top/upper selective gate electrodes and the bottom/lower gate electrodes function as word lines. The intersection of a word line and a semiconductor channel forms a memory cell. The top/upper selective gates are connected to word lines for row selection, and the bottom/lower selective gates are connected to bit lines for column selection. Examples of 3D NAND flash memory devices and methods for forming the same can be found in U.S. Pat. No. 10,559,592, titled "Memory Device and Forming Method Thereof," which is hereby incorporated by reference in its entirety.

Each of the NAND flash memory cells 172 indicates one or more bit values stored therein. Specifically, each NAND flash memory cell 172 can include a transistor with a floating gate that stores charge. NAND flash memory cells 172 are coupled in form of multiple series strings 174, wherein drains of the memory cells are each coupled to a source of another NAND flash memory cell 172. NAND flash memory arrays 170 can include word lines WL0-WLN. Each of the word lines WL0-WLN can be connected to control gates of each NAND flash memory cell 172 of a row of NAND flash memory array 170 and utilized to bias the control gates of the NAND flash memory cells 172 in the row. NAND flash memory arrays 170 also includes bit lines BL0-BLK. Each of the bit lines BL0-BLK is coupled to a series string 174 and coupled to data cache 162. Sensing circuitry (not shown, but apparent to POSA) can be controlled by control logic 130 to detect the states of each NAND flash memory cells 172 by sensing voltage or current on a particular bit line of bit lines BL0-BLK.

Other suitable circuitry components can be included in the schematic circuit diagram of FIG. 2 and are not illustrated for simplicity. For example, selection gates, sensing circuitry, address decoders, driving circuits, other supporting logic/circuits, and any suitable circuitry components can be included and are omitted here for sake of brevity.

Figure 3:
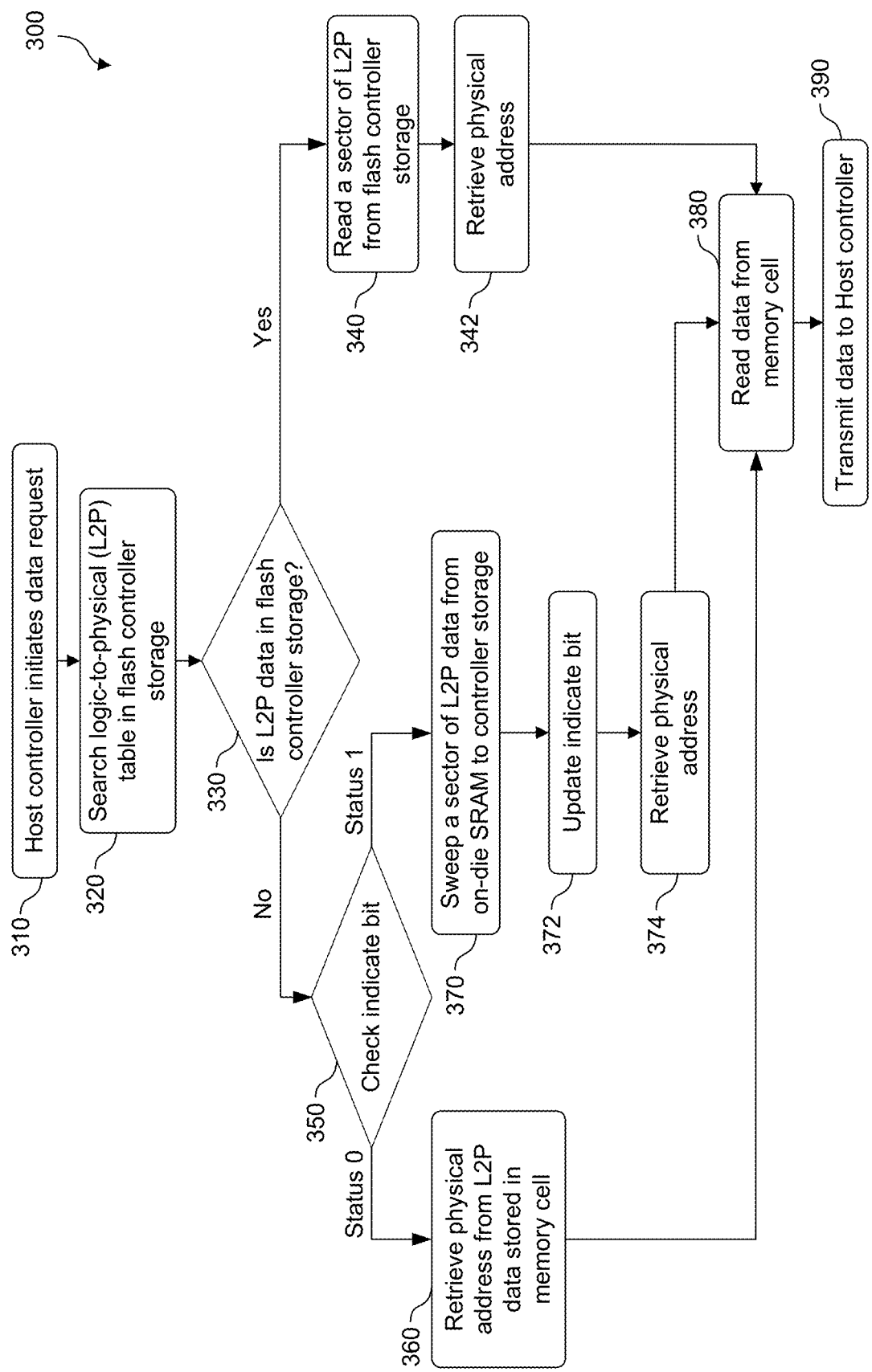
FIG. 3 is a flow chart illustrating an operation of a flash memory system, in accordance with some embodiments of the present disclosure.

FIG. 3 is a flow chart illustrating an operation of a flash memory system implementing an on-die SRAM for reducing data read latency, according to some embodiments of the present disclosure. It should be understood that the method 300 are not exhaustive and that other operation steps can be performed as well before, after, or between any of the illustrated operation steps. In some embodiments, some operation steps of method 300 can be omitted or other operation steps can be included, which are not described here for simplicity. In some embodiments, operation steps of method 300 can be performed in a different order and/or vary. Method 300 can be performed using flash memory devices and circuitry described in FIGS. 1 and 2.

Method 300 starts at operation step 310, where a host controller initiates a user data read request, according to some embodiments of the present disclosure. Referring to FIG. 1, host controller 102 may initiate a user data request command to flash memory controller 110 through interface 104 requesting a specific piece of user data that is stored in flash memory array 170. In some embodiments, the request command may contain one or more logical addresses of the requested user data.

Method 300 continues with operation step 320, where the flash memory controller scans and searches L2P table in the media storage (e.g., SRAM) of the flash memory controller, according to some embodiments of the present disclosure. Referring to FIG. 1, flash memory controller 110 can be configured to receive the user data request from host controller and instruct FTL 140 to search controller storage 132 of flash memory controller 110 to determine if controller storage 132 contains the mapping information of the requested user data. In some embodiments, controller storage 132 can include a single-level direct L2P mapping of a selection of user data. For example, to reduce read latency, the storage media of flash memory controller 110 can contain single-level direct L2P mapping information for user data that is frequently accessed by the user. In some embodiments, the storage media of flash memory controller 110 can also contain a sector of L2P mapping information. For example, under a multi-level mapping scheme, controller storage 132 can include page global directories and FTL 140 can be configured to search the page global directories.

Method 300 continues with operation step 330, where the FTL is configured to determine if the L2P data is stored in the controller media storage, according to some embodiments of the present disclosure. In some embodiments, the user data request initiated by host controller can contain logical address information of the requested data. Referring to FIG. 1, FTL 140 can be configured to determine if the L2P address information corresponding to the logical address information is stored in the controller media storage or in the flash memory dies.

If the FTL determines that the L2P address information is stored in the flash controller storage, method 300 continues with operation step 340, where the FTL reads a sector of L2P information from the flash controller storage, according to some embodiments of the present disclosure. Referring to FIG. 1, FTL 140 can be configured to search contents of controller storage 132 to identify the sector of L2P mapping data that corresponds to the logical address information received from host controller 102. Method 300 continues with operation step 342, where the physical address is retrieved based on the reading of the L2P data. Under a single-level direct L2P mapping scheme, FTL 140 can look up the physical address in the L2P mapping table to obtain corresponding physical address of the logical address received from host controller 102.

Method 300 continues to operation step 380, where control logic 130 of flash memory controller 110 retrieves user data from NAND flash memory array 170 based on the physical address of the user data. Then method 300 continues with operation step 390, where flash memory controller transmits data to host controller. For example, flash memory controller 110 receives user data from flash memory dies 160 and temporarily stores the user data in page buffer 150 before transmitting the user data to host controller 102 through interface 104.

On the other hand, if the FTL determines that L2P address information is not stored in the flash controller storage at operation step 330, method 300 continues with operation step 350, where an indicate flag is checked to determine where the L2P address information is stored. For example, a first status (e.g., status 0) of the indicate flag can inform flash memory controller 110 that the corresponding L2P address information is stored at the spare cells in one die of the flash memory dies 160. The indicate flag can be a string of bits that provide information, such as identifying which die of the flash memory die the L2P address information is stored. For example, the indicate flag can be one or more bits of information stored in controller storage 132. The indicate flag can also include the block information whether the L2P mapping information is stored in NAND flash memory array 170 or on-die SRAM 164. If the L2P address information is stored at the spare cells of the NAND flash memory array 170, method 300 continues with operation step 360, where FTL 140 can be configured to retrieve the physical address from L2P data stored in the spare cells of NAND flash memory array 170. The indicate flag can include information that directs flash memory controller 110 to a specific die that contains the L2P data.

Alternatively, a second status (e.g., status 1) of the indicate flag can inform flash memory controller 110 that the corresponding L2P address information is stored in the on-die SRAM. The indicate flag can also be configured to include the identification of on-die SRAM, such as the die number on which the on-die SRAM is located. The indicate flag can further include identification of a sector of the on-die SRAM on which the relevant portion of L2P mapping information is stored. In such scenario, method 300 continues with operation step 370, where the FTL can be configured to sweep a sector of L2P mapping data from the on-die SRAM onto the controller storage, according to some embodiments of the present disclosure. Based on information provided by the indicate flag, the FTL can identify a sector of a specific on-die SRAM of flash memory dies 160 and sweep the sector of L2P mapping data from on-die SRAM 164 to controller storage 132. In some embodiments, sweeping the sector of L2P mapping data includes transmitting the sector of the L2P mapping data from on-die SRAM 164 to flash memory controller 110 and storing the sector of L2P mapping data in controller storage 132. Method 300 continues with operation 372, where the FTL updates the indicate flag, according to some embodiments of the present disclosure. Referring to FIG. 1, FTL 140 can update the indicate flag to include information of the sector of L2P mapping data that is currently stored in controller storage 132. The stored information can be available for subsequent read requests. Method 300 continues with operation 374, where physical address can be retrieved from the L2P data, according to some embodiments of the present disclosure. FTL 140 can be configured to scan and read the L2P data that has been swept onto controller storage 132 and obtain the physical address that corresponds to the logical address provided by host controller 102. The indicate flag can include one or more additional suitable status.

Method 300 then continues with operation step 380, where data is read from the memory cells, according to some embodiments of the present disclosure. Based on the physical address obtained by FTL 140, control logic 130 of flash memory controller 110 retrieves user data from NAND flash memory array 170 based on the physical address of the user data.

Method 300 then continues with operation step 390, where flash memory controller transmits data to host controller. For example, flash memory controller 110 receives user data from flash memory dies and transmits the user data to host controller 102 through interface 104.

Various embodiments of the present disclosure are directed to systems and methods for reducing latency in flash memory systems without expanding device footprint. For example, flash memory dies can include SRAM storage that are located on the same die as the NAND flash memory arrays. The methods can include program codes and/or algorithms that implement one or more indicate flags for providing the location of the L2P table that include address-mapping information for the target data. For example, the indicate flag can display a first status indicating that the target L2P table is stored in the on-die SRAM storage or a second status indicating that it is stored in the SRAM of the flash memory controller.

In some embodiments, a method for reading data from a flash memory includes receiving, by a flash memory controller, a read request for data stored in a plurality of flash memory dies. The read request contains a logical address of the data. Each flash memory die of the plurality of flash memory dies includes one or more flash memory arrays and one or more on-die static random access memory (SRAM) storage devices. The method also includes identifying an on-die SRAM storage of a flash memory die containing logical-to-physical (L2P) information and searching the L2P information to obtain a physical address of the data that corresponds to the logical address. The method further includes retrieving the data from a flash memory array of the flash memory die using the physical address.

In some embodiments, a method for reading data from a flash memory includes receiving, by a flash memory controller, a read request for data stored in a plurality of flash memory dies. The read request includes a logical address of the data and the flash memory controller includes a controller storage. Each flash memory die of the plurality of flash memory dies includes one or more flash memory arrays and one or more on-die static random access memory (SRAM) storage. The method also includes searching the controller storage for logical-to-physical (L2P) information. In response to the L2P information being in the controller storage: the method includes obtaining a physical address of the data using the L2P information and retrieving the data from the plurality of flash memory dies using the physical address. In response to the L2P information not being in the controller storage, the method includes identifying an on-die SRAM storage device of a flash memory die containing the L2P information and searching the L2P information to obtain a physical address that corresponds to the logical address. The method further includes retrieving the data from a flash memory array of the flash memory die using the physical address.

In some embodiments, a flash memory system includes a plurality of flash memory dies. Each flash memory die includes one or more NAND memory arrays and one or more on-die SRAM storage devices. The flash memory system also includes a flash memory controller including a controller storage and one or more processors. Upon executing instructions, the one or more processors are configured to receive a read request for data stored in the plurality of flash memory dies, wherein the read request comprises a logical address of the data. The one or more processors are further configured to identify an on-die SRAM storage containing logical-to-physical (L2P) information, the on-die SRAM storage device formed on a flash memory die of the plurality of flash memory dies. The one or more processors further configured to search the L2P information to obtain a physical address of the data that corresponds to the logical address. The flash memory controller is also configured to retrieve the data from a NAND memory array of the flash memory die using the physical address.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A method for reading data from a flash memory, comprising:
   receiving, by a flash memory controller, a read request for data stored in a plurality of flash memory dies, wherein:
      the read request comprises a logical address of the data; and
      each flash memory die of the plurality of flash memory dies comprises one or more flash memory arrays and one or more on-die static random access memory (SRAM) storage devices;

identifying an on-die SRAM storage device of a flash memory die containing logical-to-physical (L2P) information;

searching the L2P information to obtain a physical address of the data that corresponds to the logical address; and retrieving the data from a flash memory array of the flash memory die using the physical address.

2. The method of claim 1, further comprising searching for the L2P information in a controller storage of the flash memory controller.

3. The method of claim 2, further comprising, in response to the L2P information not being in the controller storage, identifying the flash memory die containing the L2P information.

4. The method of claim 3, wherein identifying the L2P information comprises determining a sector of an L2P mapping table.

5. The method of claim 2, further comprising checking an indicate flag in response to the L2P information not being in the controller storage.

6. The method of claim 5, wherein identifying the L2P information comprises obtaining information from the indicate flag.

7. The method of claim 6, further comprising determining a sector of an L2P mapping table based on the obtained information from the indicate flag.

8. The method of claim 7, further comprising sweeping the sector of the L2P mapping table from the on-die SRAM storage device to the controller storage.

9. The method of claim 7, further comprising updating the indicate flag with information related to the sector of the L2P mapping table.

10. The method of claim 8, wherein sweeping the sector of the L2P mapping table comprises:

transmitting the sector of the L2P mapping table from the on-die SRAM storage device to the flash memory controller; and storing the sector of the L2P mapping table in the controller storage.

11. A method for reading data from a flash memory, comprising:

receiving, by a flash memory controller, a read request for data stored in a plurality of flash memory dies, wherein:
the read request comprises a logical address of the data;
the flash memory controller comprises a controller storage; and
each flash memory die of the plurality of flash memory dies comprises one or more flash memory arrays and one or more on-die static random access memory (SRAM) storage device;

searching the controller storage for logical-to-physical (L2P) information;

in response to the L2P information being in the controller storage:
obtaining a physical address of the data using the L2P information; and retrieving the data from the plurality of flash memory dies using the physical address; and in response to the L2P information not being in the controller storage:
identifying an on-die SRAM storage device of a flash memory die containing the L2P information;
searching the L2P information to obtain the physical address that corresponds to the logical address; and
retrieving the data from a flash memory array of the flash memory die using the physical address.

12. The method of claim 11, further comprising checking an indicate flag in response to the L2P information not being in the controller storage.

13. The method of claim 12, wherein identifying the L2P information comprises obtaining information from the indicate flag.

14. The method of claim 13, further comprising determining a sector of an L2P mapping table based on the obtained information from the indicate flag.

15. The method of claim 14, further comprising sweeping the sector of the L2P mapping table from the on-die SRAM storage device to the controller storage.

16. A flash memory system, comprising:
a plurality of flash memory dies, wherein each flash memory die comprises:
one or more NAND memory arrays; and
one or more on-die SRAM storage devices;
a flash memory controller comprising:
a controller storage; and
one or more processors which, upon execution of instructions, are configured to:
receive a read request for data stored in the plurality of flash memory dies, wherein the read request comprises a logical address of the data;
identify an on-die SRAM storage device containing logical-to-physical (L2P) information, the on-die SRAM storage device being formed on a flash memory die of the plurality of flash memory dies;
search the L2P information to obtain a physical address of the data that corresponds to the logical address; and
retrieve the data from a NAND memory array of the flash memory die using the physical address.

17. The flash memory system of claim 16, wherein the flash memory controller further comprises a flash translation layer (FTL) configured to obtain the physical address of the data.

18. The flash memory system of claim 16, wherein the flash memory controller further comprises an indicate flag containing a location of the L2P information.

19. The flash memory system of claim 18, wherein the location comprises an address of the on-die SRAM storage device.

20. The flash memory system of claim 16, wherein the L2P information comprises multi-level mapping schemes.

* * * * *